STEPPED DIGITAL FILTER

Filed July 29, 1968 5 Sheets-Sheet 1

INVENTOR
JOHN DAVID RHODES
BY Louis Orenbuch
ATTORNEY

Aug. 25, 1970 J. D. RHODES 3,525,954
STEPPED DIGITAL FILTER
Filed July 29, 1968 3 Sheets-Sheet 2

INVENTOR
JOHN DAVID RHODES
BY Louis Orenbuch
ATTORNEY

Aug. 25, 1970 J. D. RHODES 3,525,954

STEPPED DIGITAL FILTER

Filed July 29, 1968 5 Sheets-Sheet 3

INVENTOR
JOHN DAVID RHODES

BY Louis Orenbuch
ATTORNEY

INVENTOR
JOHN DAVID RHODES
BY Louis Orenbuch
ATTORNEY

STEPPED DIGITAL FILTER

INVENTOR
JOHN DAVID RHODES
BY Louis Orenbuch
ATTORNEY

United States Patent Office 3,525,954

Patented Aug. 25, 1970

3,525,954

STEPPED DIGITAL FILTER

John David Rhodes, Natick, Mass., assignor to Microwave Development Laboratories, Inc., a corporation of Massachusetts Filed July 29, 1968, Ser. No. 748,318
Int. Cl. H03h 7/08; H01p 3/08
U.S. Cl. 333—73 5 Claims

ABSTRACT OF THE DISCLOSURE

A band-pass, elliptic function, microwave filter is disclosed having a pair of digital networks connected in parallel. Each network is formed of parallel digits disposed between ground planes, the spacing between digits being approximately the same in both networks. All the digits in each network are of equal length and each is one-eighth wavelength long at the mid-band frequency of the filter. Corresponding digits of the two networks are substantially in alignment and have their ends joined to form one-quarter wavelength long digits. The digits of one network terminate in short circuits, the digits of the other network terminate in open circuits, and the impedances of the digits in one network are different from the impedances of the digits in the other network whereby the one-quarter wavelength digits are stepped in impedance at their midpoints.

SUMMARY OF THE INVENTION

This invention relates in general to passive apparatus for filtering signals which are in the microwave portion of the electromagnetic frequency spectrum. More particularly the invention pertains to a compact, elliptic function, microwave filter utilizing a digital line having stepped impedance levels.

DISCUSSION OF THE PRIOR ART

The design and synthesis of various types of microwave. elliptic function filters have been described in the technical literature. The theoretical advantages which derive from designing a microwave filter to exhibit an elliptic function response rather than a Tchebycheff response has led to the proposal of various forms of physical networks for obtaining the elliptic response.

It has been proposed by N. Saito in his monograph "Coupled Transmission-Line Filter," Sci. Repts. Res. Instit. Tohoku University, Sendai, Japan, Ser. B (Elec. Comm.) vol. 14, No. 1, pp. 9–19, 1962, to utilize the symmetrical nature of the odd ordered elliptic filter by means of a cascade of symmetrical two-wire couple lines terminated in either an open or short circuited stub. A sever limitation arises, however, because of the inability to synthesize impedance values that can be physically realized except in the case of bandwidths which are in the order of an octave.

The problem of attaining physically realizable impedance values is common to most of the subsequently proposed filters. Schiffman and Young in the I.E.E.E. Transactions on Microwave Theory and Techniques, vol. MTT–14, No. 10, pp. 474–482, October 1966, have published design tables for an elliptic function, band stop filter of degree 5 using redundant unit element. The synthesis technique used is based upon the conventional partial pole extraction procedure, which permits the poles of attenuation to be realized by simple and double shunt stubs. For most bandwidths, it was found, that practical techniques for overcoming high impedance values had to be employed and that such techniques failed in the case of narrow bandwidths.

Levy and Whiteley reported in "Synthesis of Distributed Elliptic Function Filters From Lumped-Constant Prototypes," I.E.E.E. Trans. on Microwave Theory and Techniques, vol. MTT–14, No. 11, pp. 506–517, November 1966, that by using coupled-line structures, a systematic procedure was formulated for the introduction of redundant unit elements into a distributed network based upon the lumped prototype, while reasonable element values were preserved. In the case of the narrow-band, band-stop filter, by initially resonating the low-pass prototype before incorporating the unit elements, normalized impedance values of the order of unity were maintained. However, a successful narrow band, bandpass filter using that technique was not reported.

The design procedures of Levy and Whiteley rely upon the tables, "Der Entwurf von Filtern mit Hilfe des Kataloges Normierter Tiefpasse," Backnay, Wurttember, Germany, Telefunken G.M.B.H., 1964, of R. Saal for lumped, low-pass, prototype, elliptic function filters. That reliance on R. Saal's tables avoids the task of constructing bounded, real, reflection coefficients from the prescribed insertion-loss function. However, Horton and Wenzel in "Realization of Microwave Filters With Equal Ripple Response in Both Pass and Stop Bands," Proceedings of the Symposium on Generalized Networks, vol. 16, pp. 257–287, Polytechnic Institute of Brooklyn Press, 1966, have shown that the unit elements necessary to the realization procedures may contribute to the insertion loss characteristic. It is therefore apparent that for the optimum design of a filter, a superior characteristic may be computed, thus making Saal's table inapplicable.

A compact form of wide band, elliptic function filter is reported by Horton and Wenzel in "The Digital Elliptic Filter—A Compact Sharp-Cutoff Design for Wide Bandstop of Bandpass Requirements," I.E.E.E. Trans. on Microwave Theory and Techniques, vol. MTT–15, No. 5. pp. 307-314, May 1967. In the Horton and Wenzel filter a direct digital line realization of the basic lumped form of elliptic function filter was achieved. No unit elements were incorporated into the network, resulting in a canonic realization. That network possesses the advantage of direct conversion of the tabulated element values of the low-pass prototype into physical dimensions of the digital line. Unfortunately, this realization has a number of disadvantages, among which are (1) that it is impossible to construct narrow-band filters and (2) that difficulties are encountered when the operating range is extended into higher microwave frequencies due to awkward interconnection of the series stubs.

Using any of the preceding realization techniques, it is difficult, if not impossible, to construct a practical narrow-band, band-pass, elliptic function microwave filter. Some of the reasons for the inadequacy of those procedures are given below.

The resonant circuits which provide the poles of attenuation in the elliptic function filter possess elements that are proportional to the bandwidth scaling factor and others which are inversely proportional. If a direct digital elliptical realization is attempted, for small scaling factors one set of elements tends to become physically unrealizable, while for large scaling factors, the other set of elements becomes physically unrealizable. Similarly, in Saito's direct synthesis procedure, the parameters of the adjacently extracted two-wire lines are respectively approximately proportional to the scaling factor. In those cases where redundant unit elements are introduced into the networks, the situation tends to deteriorate because the impedances of the unit elements are invariant to the bandwidth scaling factor, unless, in the band-stop case, resort is had to the resonating techniques of Levy and Whiteley. Their technique for realizing resonant sections in cascade with a unit element, however, does not necessarily provide a successful solution for a narrow-band, band-pass filter. Other forms of resonant section realizations proposed by Levy in "Three-Wire-Line Interdigital Filters of Chebyshev and Elliptic-Function Characteristic for Broad Bandwidths," I.E.E. Electronics Letters, vol. 2, No. 12, December 1966, are inherently broad-band.

OBJECTIVES OF THE INVENTION

The principal objective of this invention is to provide a compact, narrow-band, band-pass, elliptic function, microwave filter.

A further objective is to fill the need for a realizable, elliptic function, microwave filter in which the resonant sections that provide the poles of attenuation are relatively insensitive to the bandwidth scaling factor, whereby bandwidths from approximately one octave down to very narrow bandwidths can be attained.

THE INVENTION

The invention resides in an elliptic function microwave filter employing a pair of digital networks that are connected in parallel. Each network is comprised of spaced parallel digits disposed between ground planes, the spacing between diigts being approximately the same in both networks. The digits in each network are all of the same length and are one-eighth of a wavelength long at a selected frequency in the filters pass band. Corresponding digits of the two networks are substantially in alignment and their ends are joined to form integral digits that are one-quarter wavelength long. The integral digits terminate in short circuits at one end and at open circuits at the other end in the manner of a comb line. Because the impedances of the digits in one network are different from the impedances in the other network, the integral digits are stepped in impedance at their midpoints.

THE DRAWINGS

The invention, both as to its construction and mode of operation, can be better understood from the following exposition when considered together with the accompanying drawings in which.

Figure 3:
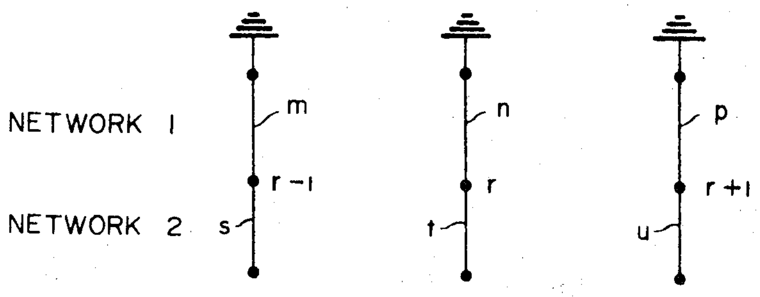
Figure 4:
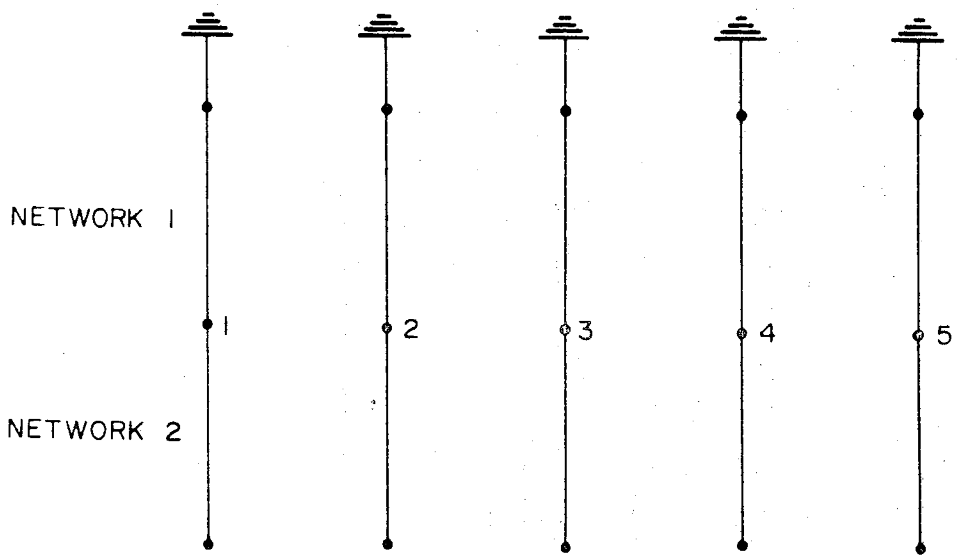
Figure 5:
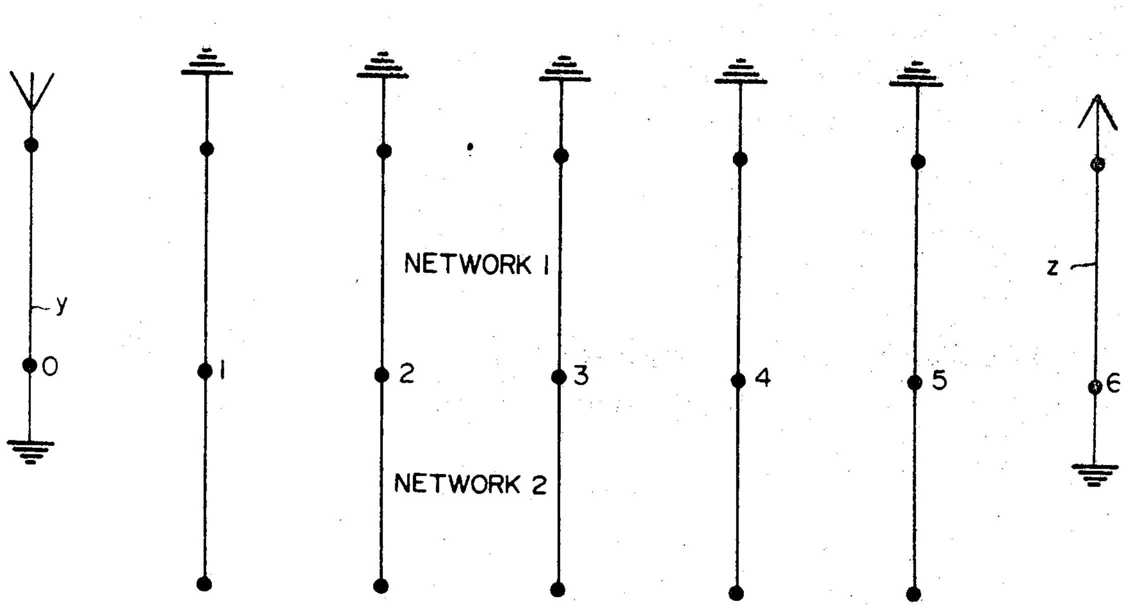
Figure 6:
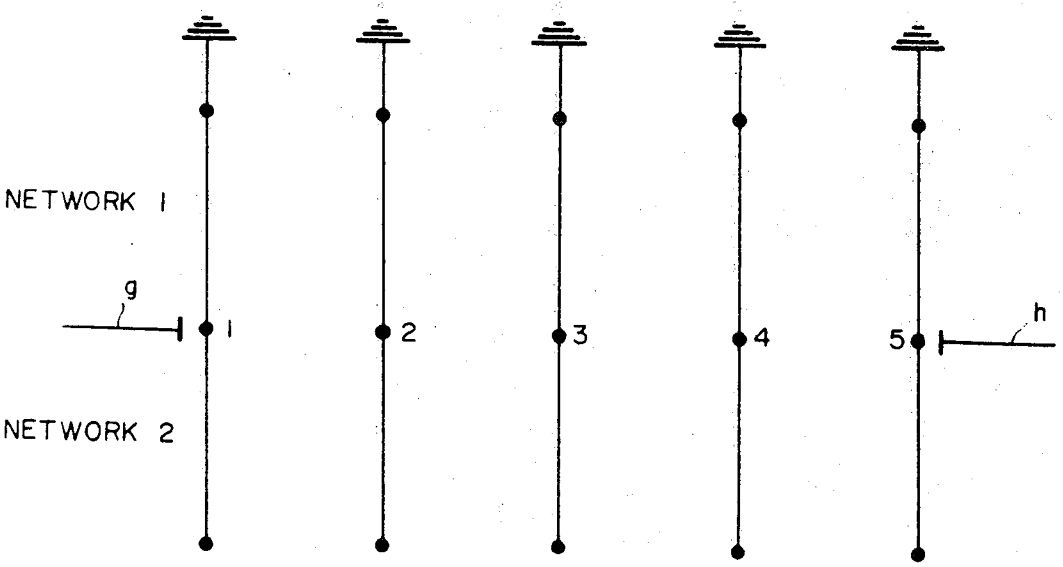
Figure 7:
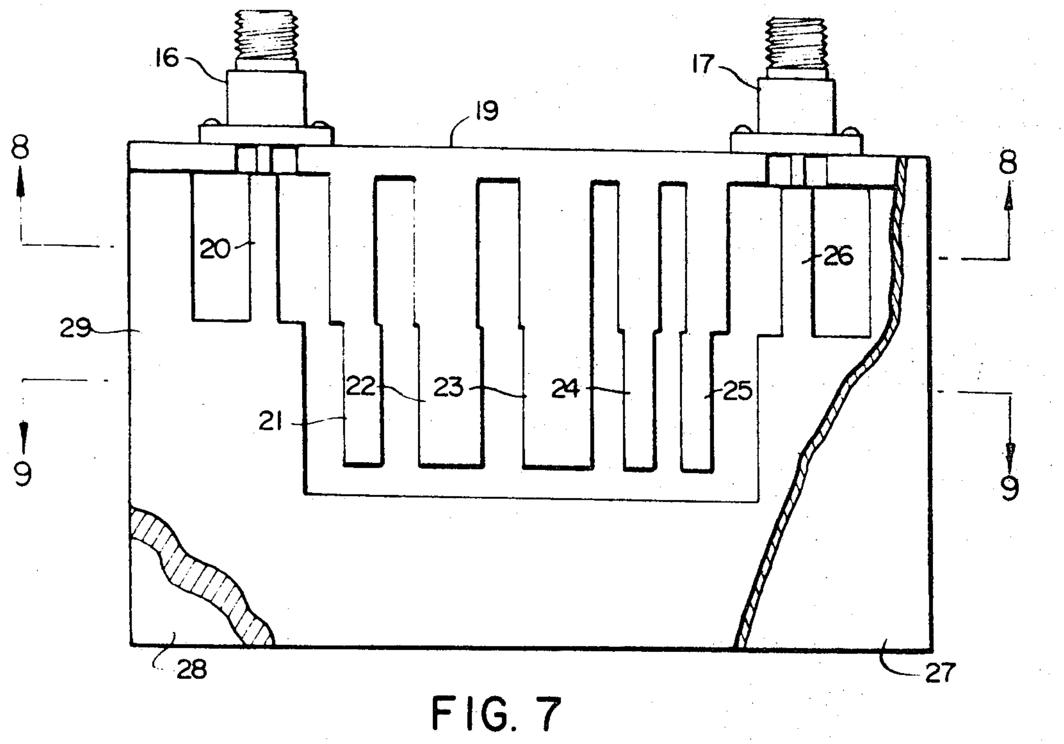
Figure 8:
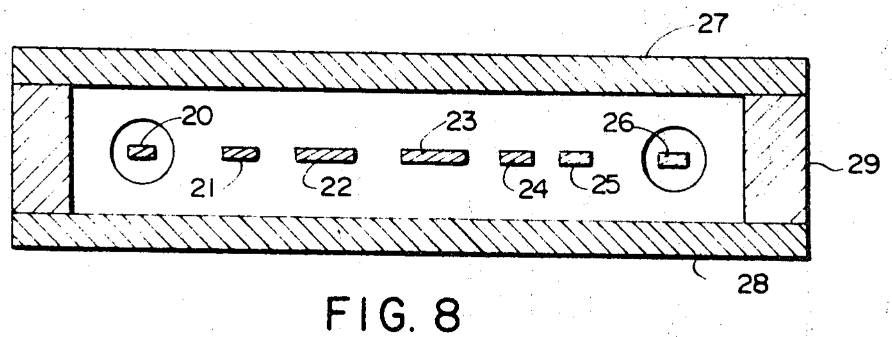
Figure 9:
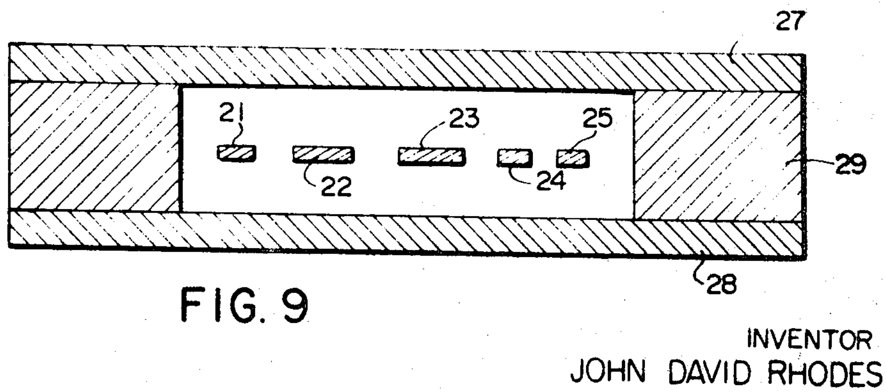
Figure 10:
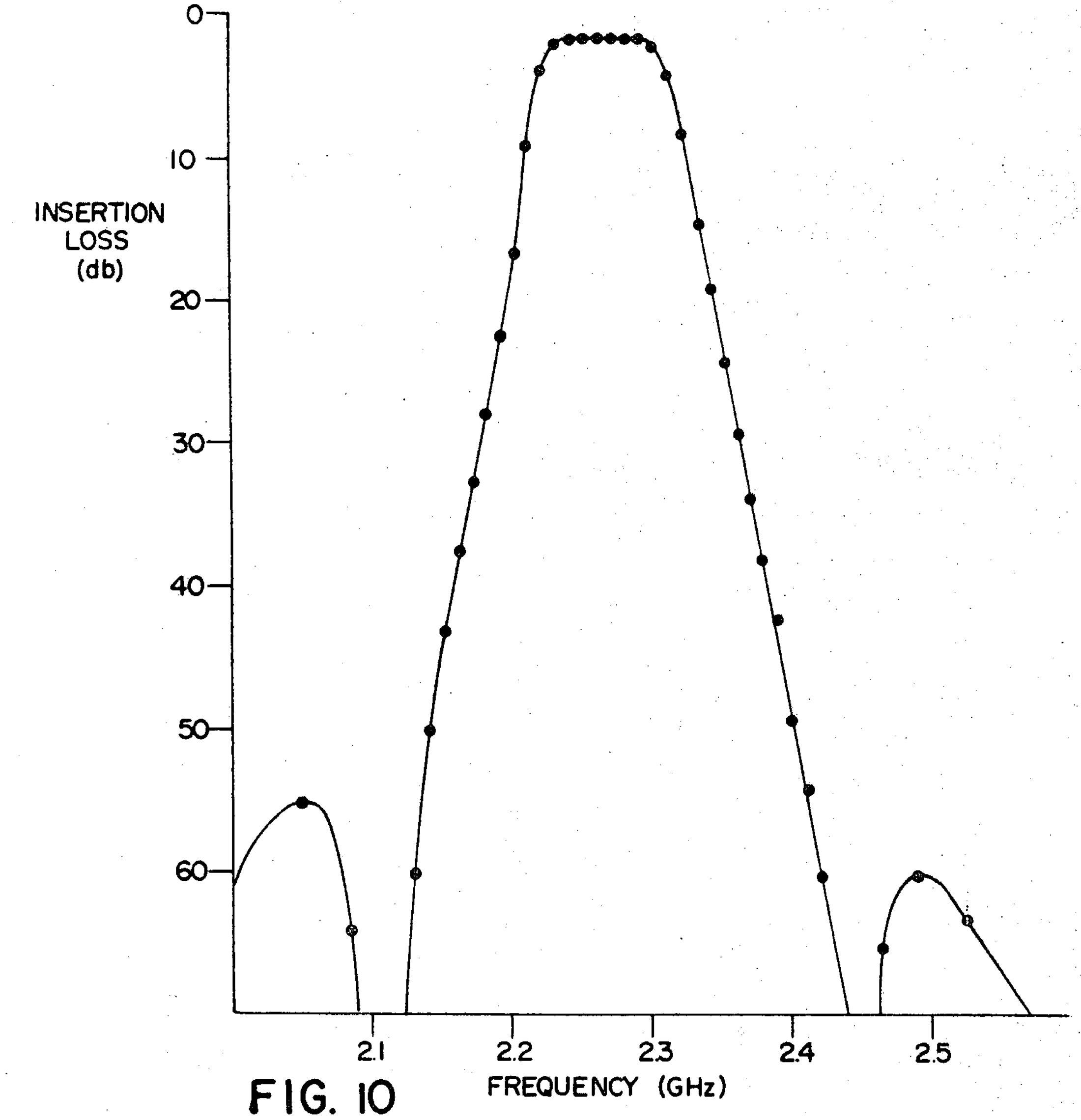

FIG. 3 schematically depicts a pair of three line digital networks connected in parallel;

FIG. 4 shows the scheme of a pair of parallel connected five line digital networks;

FIG. 5 illustrates coupling the input and output to the digital networks by employing transforming end digits;

FIG. 6 illustrates capactive input and output couplings to the digital networks;

FIG. 7 depicts an embodiment of the invention having its upper ground plane plate broken away to show the stepped digits;

FIGS. 8 and 9 are sectional views taken along the parting planes indicated in FIG. 7;

FIG. 10 is a graph showing the performance of the FIG. 7 filter; and

Figure 11:
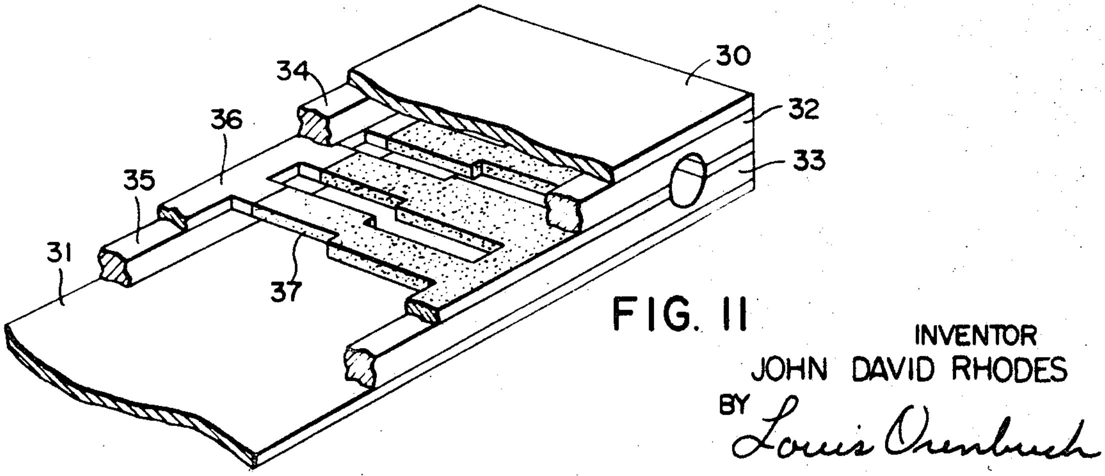

FIG. 11 depicts an embodiment of the invention in which the digital line is constructed as a conductive coating on a dielectric support.

THE EXPOSITION

Figure 1:
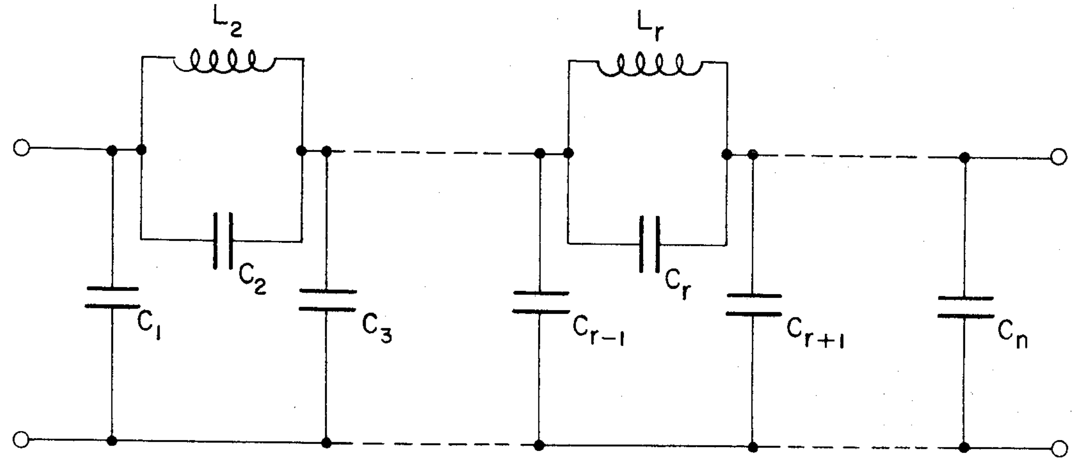
FIG. 1 shows the scheme of an odd ordered, lumped, prototype, elliptic function filter.

Referring now to FIG. 1 of the drawing, that figure schematically depicts one of the two basic forms of the odd ordered, lumped, prototype, elliptic function filter. This basic form is a cascade of $\pi$ sections. In each section the legs of the $\pi$ are shunt capacitances and the cap is a parallel resonant circuit. It is this cascade of $\pi$ sections that, for microwave frequencies is realized in the form of a stepped, digital line, elliptic function filter.

Consideration is here initially given to the realization of a typical section with shunt capacitances $C^1_{r-1}$ and $C^1_{r+1}$ and with a transmission zero at $$\Omega_r=\frac{1}{\sqrt{L_rC_r}}$$

The usual procedure for the conversion into a microwave band-pass filter is to apply the high-pass transformation $$\omega\rightarrow\frac{\tan\omega_0}{\tan\omega}\qquad(1)$$

where the normalized center frequency of the band is at $\omega=\pi/2$ and the edge frequencies of the band are at $\omega=\omega_0$ and $\omega=\pi-\omega_0$ in the fundamental period. The transformation, however, implies that the impedance values of three of the elements are inversely proportional to tan $\omega_0$ and one is proportional to tan $\omega_0$. For narrow bandwidths tan $\omega_0\gg1$ and this results in at least one extreme impedance value even where the entire impedance level of the network is adjusted by impedance transformers at the input and out output ports, in the manner of conventional interdigital networks, discussed by Wenzel in "Exact Theory of Interdigital Bandpass Filters and Related Coupling Structures," I.E.E.E. Trans. of Microwave Theory and Techniques, vol. MTT-13, No. 9, pp. 559–575, September 1965.

The solution to this problem resides in the application of the conventional band-pass transformation $$\omega\rightarrow a\left(\tan\omega-\frac{1}{\tan\omega}\right)\qquad(2)$$

where $$a=\frac{\tan 2\omega_0}{2}\qquad(3)$$

The band center frequency is then normalized to $\omega=\pi/4$ and the band edge frequencies to $\omega=\omega_0$ where $$\omega_0<\frac{\pi}{4}$$

and $$\omega=\frac{\pi}{2}-\omega_0$$

This procedure has theoretically doubled the degree of the network but by using a stepped digital line, the number of non-redundant coupled-lines necessary to realize any given elliptic function microwave filter is equal to the degree of the low-pass lumped prototype. Throughout this discussion, the degree of the networks is assumed to be the degree of the resulting reflection coefficient.

Figure 2:
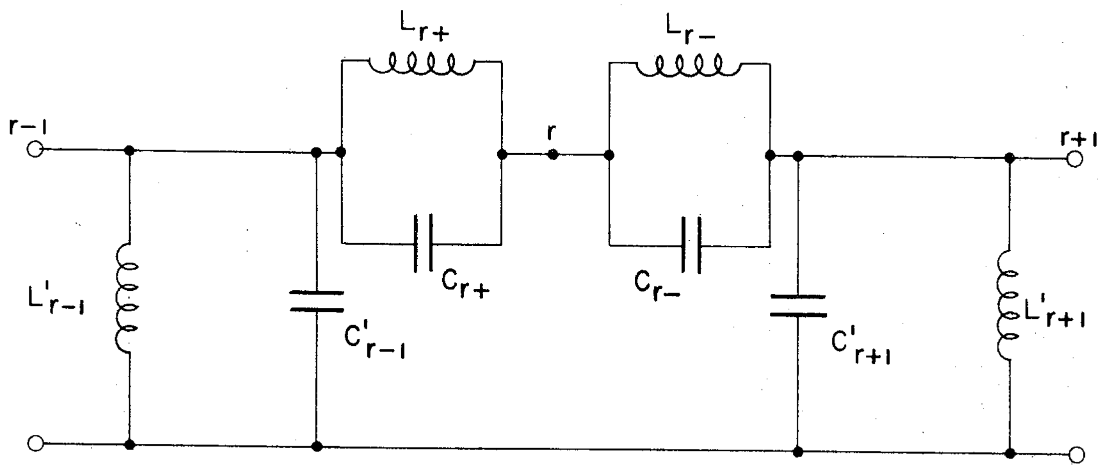
FIG. 2 depicts a basic section of the lumped prototype filter generated by a resonating technique.

Applying this resonating technique to the basic section under consideration, the section shown in FIG. 2 is generated where the pertinent element values are, $$C^1_{r-1}=aC_{r-1}\quad C^1_{r+1}=aC_{r+1}$$

$$L^1_{r-1}=\frac{1}{C^1_{r-1}}\quad L^1_{r+1}=\frac{1}{C^1_{r+1}}$$

$$C_{r+}=\frac{1}{L_{r-}}=aC_r(1+\lambda^2_{r-})$$

$$C_{r-}=\frac{1}{L_{r-}}=aC_r(1+\lambda^2_{r+})\qquad(4)$$

where $$\lambda_{r\pm}=\sqrt{\left(\frac{\Omega_r}{2_a}\right)^2+1}\pm\frac{\Omega_r}{2_a}\qquad(5)$$

For a narrow band filter $a\gg1$, and for most practical microwave filter this implies that $a\gg\Omega_r$ for all $r$. It follows immediately from Equation 5 that $\lambda_{r+}$ and $\lambda_{r-}$ are of the order of unity, and from Equation 4 that the admittance levels of all the elements in the network are approximately directly proportional to the bandwidth scaling factor $a$. It is apparent, therefore, that where the coupling into the network is made through transformer action, the resonant sections become relatively invariant to bandwidth scaling.

Before considering a method for achieving the transformer action, the coupled-line realization of the basic network is here pursued.

From FIG. 2, a direct realization of the resonant section is a pair of 3 wire line digital networks connected, as shown in FIG. 3, in parallel. In one network, the lines *m, n,* and *p* are grounded at one end whereas the lines *s, t,* and *u* in the other network terminate in open circuits. The nodes $r-1$, $r$, and $r+1$ in FIG. 3 correspond to the nodes in the FIG. 2 network. The characteristic admittance matrices of Networks 1 and 2 may therefore be identified as Network 1:

$$\begin{array}{ccc} (r-1) & (r) & (r+1) \end{array}$$
$$\begin{bmatrix} a[C_{r-1}+C_r(1+\lambda_{r+}^2)] & -aC_r(1+\lambda_{r+}^2) & 0 \\ -aC_r(1+\lambda_{r+}^2) & aC_r[2+\lambda_{r+}^2+\lambda_{r-}^2] & -aC_r(1+\lambda_{r-}^2) \\ 0 & -aC_r(1+\lambda_{r-}^2) & a[C_{r+1}+C_r(1+\lambda_{r-}^2)] \end{bmatrix} \quad (6)$$

Network 2:

$$\begin{bmatrix} a[C_{r-1}+C_r(1+\lambda_{r-}^2)] & -aC_r(1+\lambda_{r-}^2) & 0 \\ -aC_r(1+\lambda_{r-}^2) & aC_r(2+\lambda_{r+}^2+\lambda_{r-}^2) & -aC_r(1+\lambda_{r+}^2) \\ 0 & -aC_r(1+\lambda_{r+}^2) & a[C_{r+1}+C_r(1+\lambda_{r+}^2)] \end{bmatrix} \quad (7)$$

The characteristic admittance of line *n* to ground may be made finite by scaling the admittance level of the center rows and columns in the matrices (6) and (7) by a factor greater than unity. This operation does not alter the external performance of the section between nodes $r-1$ and $r+1$ if the same scaling factor is used on both networks. An additional consideration which is necessary for physical realization, other than the normal hyperdominancy condition, is that the distance between adjacent lines of one network must approximate the distance between corresponding lines in the other network in order to obtain simple physical connections between corresponding lines of the two parallel networks. Thus, the lines *s, t,* and *u* in Network 1 must be kept substantially aligned with their corresponding lines *m, n,* and *p* in Network 2 to avoid difficulties in joining those lines at the nodes.

From the matrices (6) and (7), it may be seen that the admittance to ground of lines *n* and *t* will be the same after the necessary admittance scaling. Furthermore, because the sum of the coupling element values between lines *m* and *n* and between *n* and *p* is the same as the sum of the coupling element values between lines *s* and *t* and between *t* and *u*, the distance between lines $r-1$ and $r+1$ must inherently be approximately equal. That is, the distance between lines *m* and *p* in Network 1 must inherently approximate the distance between lines *s* and *u* in Network 2. In addition, because $\lambda_{r+}$ and $\lambda_{r-}$ are of the order of unity, the physical separation between adjacent lines in both networks must necessarily be small.

Having shown how each of the basic resonated sections in the band-pass, elliptic function, microwave filter can be constructed utilizing a pair of 3 wire digital lines, the interconnection of the basic sections to achieve a cascade is now considered.

It is known that where any two conductors in a uniform *n*-wire line are at the same potentials at their ends, then at corresponding intermediate points they are at the same potential and the two conductors may, consequently, be merged into a single line. For the overall filter, the interconnection of consecutive sections requires that the node at the junction of the outer pair of lines of one section be at the same potential as the node at the junction of the corresponding pair of lines of the adjacent section. In network 1, the ends of the lines *m, n,* and *p* opposite the nodes are grounded and therefore are at zero potential. In the adjacent section, the lines corresponding to *m, n,* and *p* are likewise grounded at one end. The appropriate pair of lines from Networks 1 of the adjacent sections may, therefore, be condensed into a single line.

In Network 2, the ends of the lines *s, t,* and *u* opposite the nodes are open circuited and need not, consequently, be at the same potential. However, it is known that a sufficient condition for the condensation of open circuited lines which are connected together at one end, is that the lines to be condensed must not be coupled directly or indirectly to any other line that is not also open circuited. Therefore, by observing the condition, appropriate lines in Networks 2 of adjacent sections may be condensed into a single line.

As an example of the line condensation procedure for a two section (5th degree) filter, the overall arrangement, as shown in FIG. 4, reduces to a pair of 5 line networks. The characteristic admittance matrices of the two networks are as shown below.

For an elliptic function filter of degree *n*, the overall structure degenerates into a pair of uniform *n*-line networks in which the lines are one-eighth of a wavelength long at the center frequency of the band. Because the two networks are connected in parallel, the complete structure may be viewed as being a single digital line in which the digits are one-quarter of a wavelength long at the center frequency of the band and in which the digits are stepped at the nodes.

Viewing the structure as a whole, the input and output to the digital structure are situated at the nodes of the first and last digits. The direct connection of those points to external ports would yield a filter with the required $$\begin{bmatrix} a[C_1+C_2(1+\lambda_{2+}^2)] & -aC_2(1+\lambda_{2+}^2) & 0 & 0 & 0 \\ -aC_2(1+\lambda_{2+}^2) & aC_2(2+\lambda_{2+}^2+\lambda_{2-}^2) & -aC_2(1+\lambda_{2-}^2) & 0 & 0 \\ 0 & -aC_2(1+\lambda_{2-}^2) & a[C_3+C_2(1+\lambda_{2-}^2)+C_4(1+\lambda_{4+}^2)] & -aC_4(1+\lambda_{4+}^2) & 0 \\ 0 & 0 & -aC_4(1+\lambda_{4+}^2) & -aC_4(2+\lambda_{4+}^2+\lambda_{4-}^2) & -aC_4(1+\lambda_{4-}^2) \\ 0 & 0 & 0 & -aC_4(1+\lambda_{4-}^2) & a[C_5+C_4(1+\lambda_{4-}^2)] \end{bmatrix}$$

Network 1

(8)

$$\begin{bmatrix} a[C_1+C_2(1+\lambda_{2-}^2)] & -aC_2(1+\lambda_{2-}^2) & 0 & 0 & 0 \\ -aC_2(1+\lambda_{2-}^2) & aC_2(2+\lambda_{2+}^2+\lambda_{2-}^2) & -aC_2(1+\lambda_{2+}^2) & 0 & 0 \\ 0 & -aC_2(1+\lambda_{2+}^2) & a[C_3+C_2(1+\lambda_{2+}^2)+C_4(1+\lambda_{4-}^2)] & -aC_4(1+\lambda_{4-}^2) & 0 \\ 0 & 0 & -aC_4(1+\lambda_{4-}^2) & -aC_4(2+\lambda_{4+}^2+\lambda_{4-}^2) & -aC_4(1+\lambda_{4+}^2) \\ 0 & 0 & 0 & -aC_4(1+\lambda_{4+}^2) & a[C_5+C_4(1+\lambda_{4+}^2)] \end{bmatrix}$$

Network 2

(9)

electrical response, but the internal elements would be of low impedance. To overcome that problem, coupling from the input and output ports to the centers of the end digits is made by transformer action.

Referring to FIG. 5, unit elements $y$, $z$, terminating in short circuits to ground, are introduced into the network at each end. The elements $y$, $z$ are of unity characteristic impedance and are one-eighth ($\lambda/8$) of a wavelength long at the center frequency of the filter's passband. By employing the unit elements, the number of digits in Network 1 has been increased to $n+2$ and its resulting augmented characteristic admittance matrix becomes $$\begin{bmatrix} 1 & -1 & 0 & \cdots \\ -1 & 1+a[C_1+C_2(1+\lambda_{2+}^2)] & -aC_2(1+\lambda_{2+}^2) & \vdots \\ 0 & -aC_2(1+\lambda_{2+}^2) & aC_2(1+\lambda_{2+}^2+\lambda_{2-}^2) & \cdots \\ \vdots & \cdot & \cdot & \cdot \end{bmatrix} \quad (10)$$

The characteristic admittance matrix of Network 2 remains unchanged. A dual coupling system might appear to be coupling into the open circuited ends of the input and output digits by employing open circuited lines. That coupling is incorrect, however, and changes the properties of the whole structure because it does not meet the sufficiency condition for line condensation of open circuited lines. Justification for using the short circuited lines $y$ and $z$ follows from the condition for line condensation of short circuited lines.

In lieu of employing the input and output transformer coupling arrangement depicted in FIG. 5, the capacitive coupling arrangement shown in FIG. 6 may be used. Coupling is made to the centers of the end digits 1 and 5 by the capacitance between ends of lines $g$, h and the adjacent center portion of the end digits.

Admittance scaling of the entire digital structure now remains to be considered. Initially, every digit in the stepped digital filter, except the digits on which the input and output ports are situated, may be scaled by the factor $\frac{1}{\sqrt{a}}$ The characteristic admittance matrices of Networks 1 and 2 then become:

$$\begin{bmatrix} 1 & \frac{-1}{\sqrt{a}} & 0 & \\ \frac{-1}{\sqrt{a}} & \frac{1}{a}+C_1+C_2(1+\lambda_{2+}^2) & -C_2(1+\lambda_{2+}^2) & \\ 0 & -C_2(1+\lambda_{2+}^2) & C_2(2+\lambda_{2+}^2+\lambda_{2-}^2) & -C_2(1+\lambda_{2+}^2) \\ 0 & 0 & -C_2(1+\lambda_{2-}^2) & C_3+C_2(1+\lambda_{2-}^2)+C_4(1+\lambda_{4+}^2) \\ \vdots & \vdots & \vdots & \vdots \end{bmatrix} \quad (11)$$

for Network 1, and $$\begin{bmatrix} C_1+C_2(1+\lambda_{2-}^2) & -C_2(1+\lambda_{2-}^2) & 0 & \vdots \\ -C_2(1+\lambda_{2+}^2) & C_2(2+\lambda_{2+}^2+\lambda_{2-}^2) & -C_2(1+\lambda_{2+}^2) & \vdots \\ 0 & -C_2(1+\lambda_{2+}^2 & C_3+C_2(1+\lambda_{2+}^2)+C_4(1+\lambda_{4-}^2) & \\ \vdots & \vdots & \vdots & \end{bmatrix} \quad (12)$$

for Network 2.

It follows, consequently, that all the lines forming the resonant circuits are relatively insensitive to the bandwidth scaling factor because the sole variation is with respect to $\lambda_{r\pm}$ which, for narrow bandwidths is in the order of unity. Therefore, the only significant change in the network due to a variation in bandwith is in the values of the coupling elements at the input and output ends of the network.

Admittance scaling can be applied to the even numbered lines in FIG. 5 to produce finite values of capacitance to ground, and to the odd numbered lines to produce additional flexibility in the physical structure. In conventional interdigital filters, scaling factors usually are chosen which cause the capacitance to ground of all the lines, except possibly the input and output lines, to be equal. Therefore, in the conventional interdigital line filter employing bar digits of rectangular cross-section, the digits are all of the same width. In the digital filter here disclosed, additional considerations must be observed. As previously stated, corresponding digits in the two parallel Networks 1 and 2 must be separated by approximately the same distance. This constraint has been shown to be inherently satisfied because of the resonated realization. The scaling factor ought, therefore, to be chosen so that there is a minimum amount of variation in the ground capacitances throughout both networks.

Most T.E.M. (transverse electromagnetic wave) mode digital line filters exhibit a periodic pass-band response. Where it is desired to obtain a filter not having that periodic response, the frequency transformation of Equation 2 is modified to $$\omega \rightarrow a\left[\frac{\tan\omega}{\tan\omega'}-\frac{\tan\omega'}{\tan\omega}\right]$$

By causing $\tan\omega'$ to differ from unity, all of the low ordered harmonics of any frequency in the fundamental pass-band are transformed into a stop-band region of the filter. The transformation changes the admittance level of Network 1 with respect to Network 2, causing an increase in the impedance steps of the digits. However, where $\tan\omega'$ is chosen to be as close to unity as is possible with the desired non-periodic frequency response, then the changes in impedance levels are held to a minimum. The modified transformation does not affect the number of digits in the stepped line.

To better illustrate the invention, the construction of a 5th degree, band-pass, elliptic function filter to operate in the S-band region is here considered. A filter with a stop-band attenuation greater than 60 db, a pass-band V.S.W.R. (voltage standing wave ratio) less than 1.22, and a 2% bandwidth is the assumed example. The element values for the 5th degree low-pass prototype filter are given on p. 82 of "Der Entwurf von Filtern mit Milfe des Kataloges Normierter Tiefpasse" by R. Saal, previously cited. The element values of the low-pass prototype are $$C_1=.9265 \quad C_2=.0587 \quad C_3=1.666$$
$$C_4=.1479 \text{ and } C_5=.8463$$

with $\Omega_2=3.6119$ and $\Omega_4=2.3038$. Normalizing the center of the pass-band to a frequency $\pi/4=.785$ radians, the band edge frequency $\omega_0$ is .777 for the 2% bandwidth filter. From Equation 3

$$a=11.54/2=5.77$$

and from Equation 5

$$\lambda_2 = 1.0626$$
$$\lambda_2 = .9413$$
$$\lambda_{4+} = 1.0395$$
$$\lambda_{4-} = .9621$$

Those values are placed into the normalized characteristic admittance matrices (9) and (10) for Networks 2 and 1 respectively. Scaling the odd order lines by a factor ⅕ (viz, a factor of the order of $1/\sqrt{a}$), results in the following characteristic admittance matrices: Network 1

| (0) | (1) | (2) | (3) | (4) | (5) | (6) |
|---|---|---|---|---|---|---|
| 1 | −.2 | 0 | 0 | 0 | 0 | 0 |
| −.2 | 1.291 | −.743 | 0 | 0 | 0 | 0 |
| 0 | −.743 | 7.010 | −.659 | 0 | 0 | 0 |
| 0 | 0 | −.659 | 2.481 | −1.831 | 0 | 0 |
| 0 | 0 | 0 | −1.831 | 17.694 | −1.694 | 0 |
| 0 | 0 | 0 | 0 | −1.694 | 1.387 | −.2 |
| 0 | 0 | 0 | 0 | 0 | −.2 | 1 |

and for Network 2

| (1) | (2) | (3) | (4) | (5) |
|---|---|---|---|---|
| 1.237 | −.659 | 0 | 0 | 0 |
| −.659 | 7.010 | −.743 | 0 | 0 |
| 0 | −.743 | 2.471 | −1.694 | 0 |
| 0 | 0 | 1.694 | 17.630 | −1.831 |
| 0 | 0 | 0 | −1.831 | 1.374 |

Scaling lines 2, 3, and 4 by the factors .45, .8, and .294 respectively, and scaling the entire matrices by a factor of 7.534 to convert to capacitance values in a 50Ω system, the resulting capacitance matrices are: For Network 1

| (0) | (1) | (2) | (3) | (4) | (5) | (6) |
|---|---|---|---|---|---|---|
| 7.534 | −1.507 | 0 | 0 | 0 | 0 | 0 |
| −1.507 | 9.729 | −2.520 | 0 | 0 | 0 | 0 |
| 0 | −2.520 | 10.794 | −1.786 | 0 | 0 | 0 |
| 0 | 0 | −1.786 | 11.968 | −3.237 | 0 | 0 |
| 0 | 0 | 0 | −3.237 | 11.426 | −3.743 | 0 |
| 0 | 0 | 0 | 0 | 3.743 | 10.448 | −1.507 |
| 0 | 0 | 0 | 0 | 0 | −1.507 | 7.534 |

and for Network 2

| (1) | (2) | (3) | (4) | (5) |
|---|---|---|---|---|
| 9,301 | −2.232 | 0 | 0 | 0 |
| −2.232 | 10.794 | −2.016 | 0 | 0 |
| 0 | −2.016 | 11.968 | −2.995 | 0 |
| 0 | 0 | −2.995 | 11.426 | −4.045 |
| 0 | 0 | 0 | −4.045 | 10.352 |

Employing bar digits of rectangular cross-section, the graphs of W. J. Getsinger in the article "Coupled Rectangular Bars Between Parallel Plates," IRE Transactions on Microwave Theory and Techniques, vol. MTT–10, No. 1, pp. 62–72, January 1962, are used to calculate the physical dimensions of the filter. Using a bar thickness to ground plane spacing ratio of .6, a filter having the digital configuration indicated in FIG. 7 is obtained.

In the embodiment of FIG. 7, the input and output connections are coaxial connectors 16 and 17 whose characteristic impedance is assumed to be 50 ohms. The digital line has five digits 21, 22, 23, 24, 25, each of which is one-quarter wavelength long at the center frequency of the filter. Compensation for fringing capacitances may necessitate some deviation from the precise quarter wavelength. Coupling to the digital line is made by transformer action through one-eighth wavelength digits 20 and 26, whose ends terminate in short circuits upon the spacer 29. The center conductor of connector 16 extends through an opening in the bar 19 and is secured to the digit 20 to establish a good electrical connection. Similarly, the center conductor of connector 17 is united to the transformer digit 26.

The digital line is disposed, as indicated in FIG. 7, between a pair of ground plane 27 and 28 whose uniform separation is maintained by the spacer 29. In the assembled filter, the digital line is completely enclosed by a structure that is at a common (i.e., ground) potential except for the input and output connections. Each of the digits 21, 22, 23, 24, 25 is open circuited at one end and is short circuited at the other end by being united with the bar 19. The impedances of the digits in Network 1 are different from the impedances of the digits in Network 2. The digits, as is evident from the sectional views of FIGS. 8 and 9, are bars of rectangular cross-section. The widths of the digits in Network 1 are shown in FIG. 8 and are different from the widths, indicated in FIG. 9, of the corresponding digits in Network 2. The digits are therefore stepped in width at their nodes.

In the FIG. 7 embodiment, the four inter-bar regions independently provide the pair of finite poles of attenuation both above and below the fundamental pass-band. This considerably simplifies the problem of tuning the filter to obtain the desired stop-band performance.

The graph of FIG. 10 shows the measured response of the narrow-band filter embodiment of FIG. 7. Frequency in gigahertz (gHz.) is plotted along the abscissa and the insertion loss in decibels (db) is plotted along the ordinate. The solid line curves shows the attenuation characteristic of the filter. The scale of the graph, however, does not permit the ripple within the pass band to be preceptible.

The invention may be embodied in many different forms. For example, the digits need not be solid metallic bars but can, as shown in FIG. 11 be a conductive coating upon a dielectric support. In the FIG. 11 embodiment, the ground planes are metallic plates 30, 31 whose separation is maintained in part by the short circuiting bars 32, 33, 34, and 35. Disposed between the short circuiting bars is a dielectric frame 36 which is partially clad with a coating of silver or copper to form a digital structure 37 that is functionally equivalent to the digital line of the FIG. 7 embodiment. The metallic coat is upon the top and bottom of the dielectric frame and to preserve the capacitance between adjacent digits, the facing edges are also clad with metal. To provide good support for the digits, the dielectric frame is not cut away at the open circuited ends of the digits. Propagation of the wave energy is largely in air so that the FIG. 11 embodiment is capable of acceptable performance despite the losses in the frame dielectric. The ground plane plates, the short circuiting bars, and the part of the clad frame situated between bars 34 and 35 are connected in a manner which insures that they are all maintained at the same electric potential.

Because the invention can be embodied in varied structures, it is not intended that the invention be limited to the forms here illustrated or described. Rather, it is intended that the invention be delimited by the appended claims and include those structures that do not fairly depart from the essence of the invention.

What is claimed is:

1. A band-pass, microwave filter comprising a pair of spaced ground planes, a network of spaced digits disposed between the ground planes, and means for coupling signals to the network, the digits of the network being one-quarter wavelength long at a frequency in the pass band, each digit being terminated in an open circuit at one end and having its opposite end connected to a common ground, and each digit being stepped in impedance at its midpoint.

2. A band-pass, microwave filter having a pair of digital networks connected in parallel and disposed between spaced ground planes, each network comprising a plurality of spaced parallel digits, the spacing between digits being approximately the same in both networks, all the digits in each network being equal in length and one-eighth wavelength long at a frequency in the filter's pass band, corresponding digits of the two networks being substantially in alignment and having their ends joined to form one-quarter wavelength long digits, the digits of one network terminating in short circuits, the digits of the other network terminating in open circuits, and the impedances of the digits in one network being different from the impedances of the digits in the other network, whereby the one-quarter wavelength digits are stepped in impedance at their midpoints.

3. A microwave filter according to claim 2, further including impedance transformers for coupling to the digital networks, the impedance transformers comprising an additional one-eighth wavelength digit at each end of the network having the short circuited digits, each of the additional digits having one end terminated in a short circuit.

4. A microwave filter according to claim 2, further including input and output means capacitively coupled to the terminal quarter wavelength digits of the networks.

5. A microwave filter according to claim 2, wherein the digits are formed by a conductive coating on a dielectric frame interposed between the ground planes.

References Cited

UNITED STATES PATENTS

| | | | |
|---|---|---|---|
| 3,327,255 | 6/1967 | Bolljahn et al. | 333—73 |
| 3,391,356 | 7/1968 | Bolljahn et al. | 333—73 |

HERMAN KARL SAALBACH, Primary Examiner

M. NUSSBAUM, Assistant Examiner

U.S. Cl. X.R.

333—84